March 8, 1938.                    M. M. FISHER                    2,110,293
                          METHOD OF RECAPPING TIRES
                           Filed Dec. 28, 1936            2 Sheets-Sheet 1
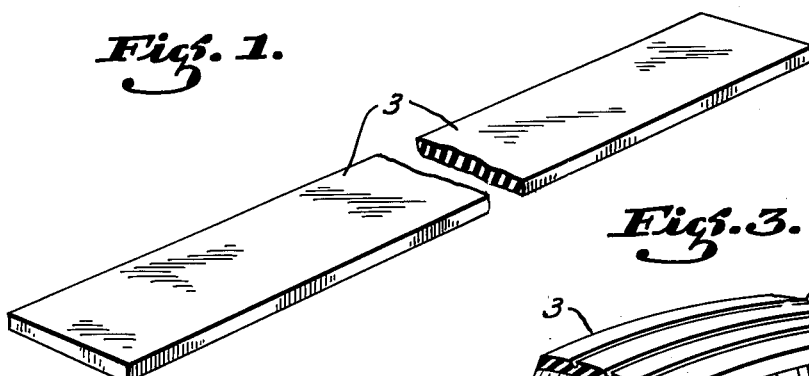
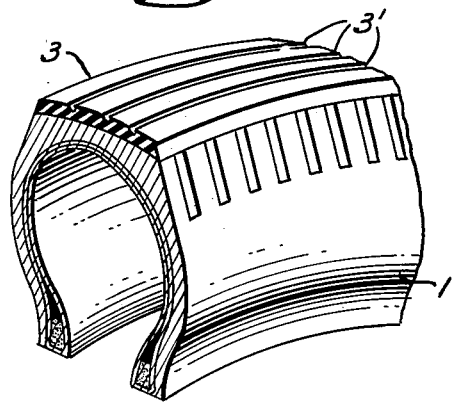
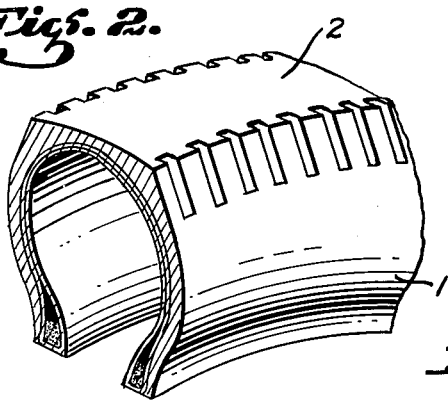
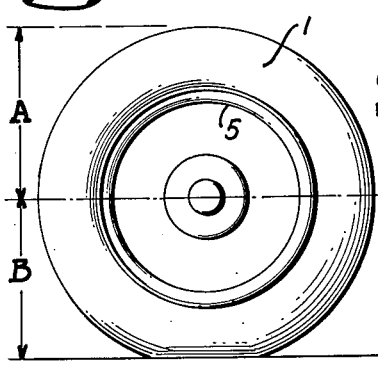
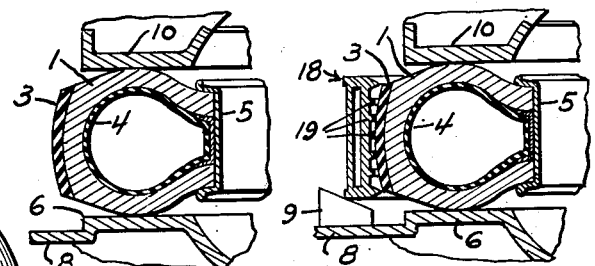
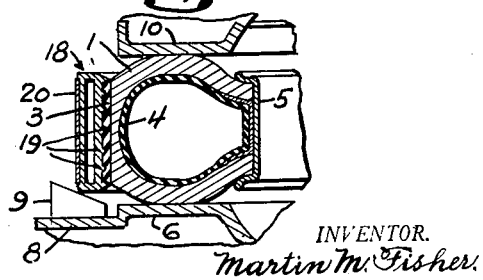
INVENTOR.
Martin M. Fisher.
BY
Chas. E. Townsend.
ATTORNEY.

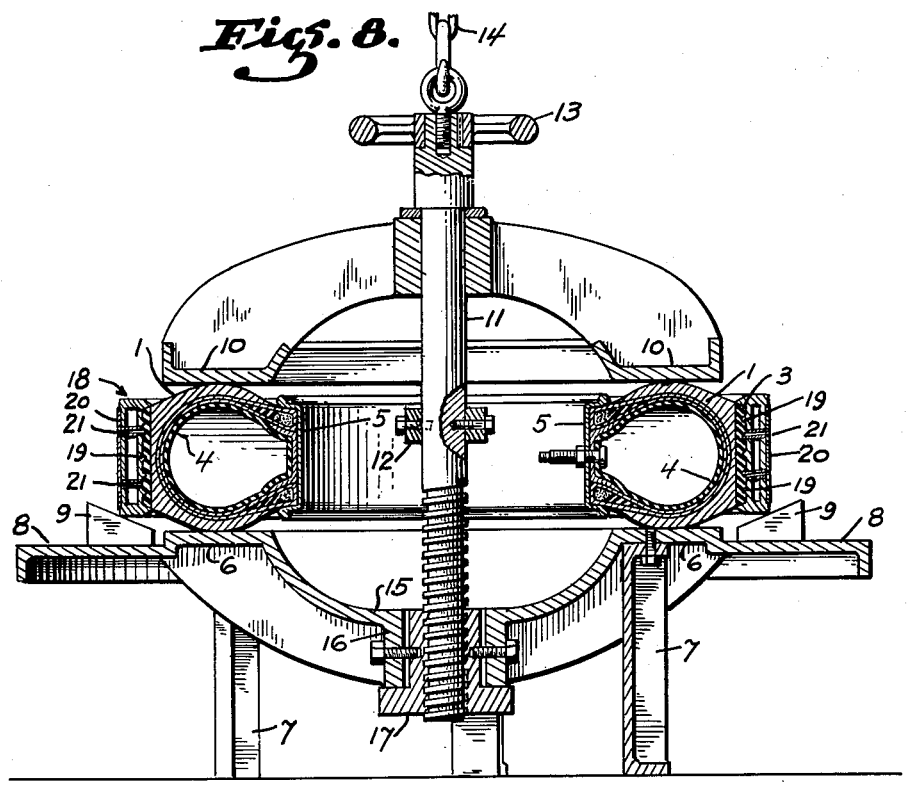

Patented Mar. 8, 1938

2,110,293

UNITED STATES PATENT OFFICE 2,110,293

METHOD OF RECAPPING TIRES

Martin M. Fisher, Seattle, Wash.

Application December 28, 1936, Serial No. 117,806

6 Claims. (Cl. 154—14)

This invention relates to an improved method of recapping tires or retreading the worn casing of a heavy pneumatic tire, for the purpose of prolonging the life and service of the tire.

This application is a continuation, in part, of my application Serial Number 23,319, filed May 14, 1935.

The high initial cost of large tires, such as used on busses and trucks, has created a need for a satisfactory method of replacing the worn tread of these tires so that the full life of the tire carcass may be insured.

This invention has been particularly designed and developed for the retreading or recapping of the large sized tires used on heavy freighting trucks. These trucks, especially as used in the western mountainous country for freighting, are arranged in units of truck and trailer, usually with twenty-two wheels and tires, the tires generally being 9.75 inches in cross sectional diameter. The loads carried are very heavy and the usage to which these tires are subjected is very rough. These tires, moreover, are very expensive. When the tread has worn down to or close to the breaker strip, it is necessary to replace them or to retread them.

Retreading and recapping methods heretofore employed have been very unsatisfactory, either because the tread or cap has not been properly cured and secured to the carcass or the latter has been subjected to such treatment as to cause it to deteriorate rapidly.

When a tire is made, the fabric carcass, with its layer of rubber and carefully weighed rubber tread, is placed in a vulcanizing mold of definite and unyielding size. The tire is inflated to a pressure approximating one hundred pounds, more or less, and its sides and tread expanded into the mold cavity; the fabric being stretched sufficiently to permit this to be accomplished. Heat is applied both inside and out and the vulcanizing or curing of the rubber content effected.

These tires, under load conditions, stretch at the same time they are being worn down. No two tires of the same make and original size are ever the same again after a substantial period of use.

Usually it has been customary to simulate, in retreading, very much the same methods that were employed in the original manufacture of the tire; that is, restretch the fabric, although it has already been stretched to its practical limits; and also in curing the retread rubber, to overheat the already cured rubber between the fabric layers.

Thus, a carcass to be retreaded, and with its green tread in position, is put more or less loosely into a mold and then expanded into the mold by inflation or otherwise, the rubber then being cured on this stretched carcass. The result has been that when the retreading operation has been completed, the tire is even more distorted than it was before the retreading. Then, when the tire is subjected to load conditions, the distortions that occur tend frequently to buckle the fabric layers, to compress into smaller compass the cured tread, and to set up movements between the tread and carcass which eventually cause the rubber tread to separate from the carcass. If the carcass to be retreaded is expanded with steam or hot water in order to aid in curing the retreading strip, it also acts to over-cure the already cured rubber between the fabric layers and thus to convert these rubber layers from cementitious binders into granular layers of no value whatever.

I have discovered that when the time comes to retread the carcass, not only is a mold of different type and size necessary from what was used in the original manufacture of the tire, but an entirely different method of procedure is necessary, not only from what was followed in the original manufacture of the tire but radically different from any other known method of retreading prior to my invention. Instead of subjecting the carcass fabric of the tire to be retreaded to further stretch, I place the tire loosely in a suitable mold, and while holding the sides of the tire against undue expansion, I apply radial pressure on the periphery of the tire until I have contracted every diameter of the tire by approximately the "rolling radius" of the tire. By "rolling radius" is meant the vertical distance from the center of the tire axis to the point of contact with the ground, with the truck under load. This rolling radius of a tire, under heavy load, is from one inch to one and one-half inches less than the normal radius of the tire completely unloaded.

Practical experience has demonstrated that in a retreaded tire, retreaded under conditions closely simulating load conditions, increased mileage and service are maintained for the tire at comparatively low cost.

The successive steps in my method of retreading or recapping the tire casing are accomplished without undue distortion of the casing. The renewed tread is affixed to the casing where the latter is in service condition under normal inflation; and the retreading is accomplished under other natural conditions of the casing, thus adapting the retreaded casing to the usual service conditions subsequently imposed when the tire is in use.

In the accompanying drawings is shown an apparatus suitable for carrying out the invention, this apparatus being that shown and disclosed in my issued Patent No. 2,030,861, dated February 18, 1936.

In the drawings:

Fig. 1 represents a portion of the retread material or "camel back" before it is applied to the tire.

Fig. 2 graphically illustrates a portion of the tire casing, with its worn thread smooth to receive the tread strips of Fig. 1.

Fig. 3 is a perspective of a portion of the retreaded tire casing.

Fig. 4 is a side elevation, schematically representing the so-called "rolling radius".

Fig. 5 shows the first position of the tire in the tire retreading mold.

Fig. 6 shows the second position, after the application of the ring mold but before the latter has been contracted to reduce the tire radius.

Fig. 7 illustrates the third and fourth positions of the tire after the ring mold has been contracted and also after the tire has been inflated.

Fig. 8 is a cross section of a suitable apparatus for practicing the invention.

Fig. 9 is a plan of the inflated and circumferentially compressed tire, with the top plate of the mold removed.

In treating the tire casing 1 according to my invention, the worn tread portion 2 is first inspected and all holes or breaks are filled in, after which the worn tread surface is dressed to a uniform finish. A coating of vulcanizing cement is now applied to the dressed surface of the tread and permitted to set, after which the rubber treadstrip or camel-back 3 is applied and fixed to the prepared periphery of the tire.

The inner tube 4 is placed in the tire and the latter is mounted upon a metal rim, as 5, after which the tire is placed in horizontal position upon a circular mold table 6, which is elevated and supported on legs, as 7. As indicated in the drawings, the table is fashioned with a slightly depressed outer annular flange 8, upon which are placed wedge-blocks 9 that are utilized in properly adjusting the mold after it is placed in position about the tire casing.

The apparatus herein shown and described for carrying out the process is that shown and described in my Patent No. 2,030,861, dated February 18, 1936, for "Tire retreading mold."

The lower side wall of the casing rests upon the mold-table, and an upper, flat, clamp ring 10, complementary to the flat annular table, rests upon the upper side wall of the casing. After the tire casing is properly centered on the table, the retaining ring 10 is brought to bear, with a slight pressure, against the upper side wall of the casing, and between the ring and the table, the side walls of the casing not being flattened. The weight of ring 10 should not be sufficient to flatten, to any appreciable extent, the heavy carcass of the tires my device is intended to recap. The success of this method of capping depends, to a large degree, on not distorting the carcass.

The retaining ring is clamped on top of the tire by means of a central spindle or screw 11 that is journaled at its upper end in a bearing of the ring and provided with a fixed collar 12 to limit motion of the spindle or screw bar. At its upper end the spindle is provided with a hand wheel 13 and the spindle and its clamp ring 10 are preferably suspended from a suitable support by a chain 14. The spindle passes down through the open center of the tire and the mold table, and the latter is fashioned with a lower flange 15, having a central hub 16 in which a stationary, non-rotary nut 17 is retained. By turning the hand wheel 13 it will be apparent that the threaded end of the spindle is screwed into the nut and the retaining ring 10 is brought to bear down on the tire casing with equal pressure on all points of the casing, owing to the single and flexible securing means provided by the spindle assembly. The pressure applied is sufficient only to retain the side walls in an undistorted condition in order that a minimum of internal stresses will be set up in the tire tread during the curing.

A hollow, sectional ring mold 18 is employed in the vulcanization of the tread-strip on the tread portion of the casing, and the sections of the ring mold are now applied at the periphery of the tire as it rests upon the mold table. The sections of the mold are adapted to be coupled together or jointed together in suitable manner about the tire, and the interior steam chambers of the separate sections communicate in order that steam, through the steam supply pipe 18' in Figure 9, may be supplied for heating purposes through the entire area of the ring mold.

On the inner surfaces of the mold sections are fashioned vertically spaced, horizontally extending ribs 19 that contact with the exterior face of the tread-strip 3, and these ribs form the complementary spaced grooves 3' extending around the periphery of the retreaded tire.

The mold sections 18 have a combined circumferential length, when joined into a true circle, of considerably less than the circumference of the outside circumference of the tread strip to be cured. When the mold sections are drawn in until they constitute one continuous ring mold, it is understood that the tread and its tire will be compressed so that the diameter of the tire will correspond substantially to the distance to double the radius A of Figure 4, with the result that the entire tire under compression will simulate the work conditions and shape of the tire under load.

Exterior pressure, as a clamping ring 20, is applied to the several jointed sections of the ring mold, and by suitable means applied to this clamping ring, after the ring mold has been properly adjusted by the use of the wedge blocks 9, the ring mold is pressed inwardly so that the ribs 19 penetrate the outer surface of the strip 3 to form the grooves 3'. A suitable number of vent pipes 21 are provided to vent the space between the ring mold and the tread strip, and these pipes are mounted transversely in the mold sections, with their outer ends open to the atmosphere.

The clamp ring 20, which embraces the ring mold, is applied thereto with sufficient pressure to draw the ring mold sections into close contact to form a continuous mold, and at the same time contract the tire at every diameter, so that each radius is substantially equal to the distance represented by the "rolling radius" B (Fig. 4). The contracting action of the clamp ring 20 flattens the tread portion of the tire so that the tread portion is retained in a position substantially perpendicular to the two side walls of the tire, and in this manner the tread of the tire is retained in such position that the entire area of the tread strip is subjected to the steam heat of the ring mold to insure vulcanization between the strip and the flattened portion of the tire-tread. During this tightening of the clamp ring 20 the side walls are somewhat distorted against table 6 and ring 10, as indicated, somewhat exaggerated, in Figure 7.

The tire is now inflated in the usual manner to an internal pressure that will hold the side walls of the casing against the exterior pressure applied by the ring and table, from ninety pounds to one hundred pounds pressure ordinarily being employed for this purpose. Internal pressure is a common and convenient means for backing up the tread portion of the casing. However, any of the various devices used for such purposes may be used if desired. The pressure of the internal air should be sufficient to hold the tread portion in the mold after the heating steam is applied.

By the coaction of the internal pressure and the external pressure, the entire tire casing, as well as the tread parts to be vulcanized, are firmly held or retained in place for a perfect vulcanization of these parts.

For applying heat in order to cure the tread strip 3, the steam normally is turned on and supplied through the steam pipe 18', the time period usually employed varying from one and one-half hours to two hours, and the steam pressure varying from 60 pounds to 70 pounds, to suit different conditions. With suitable modifications, any other equivalent heating means may be used, however. For curing time the instructions of the tread stock manufacturers should be followed, being usually between one hour and thirty minutes to two hours.

After the expiration of the proper period of time, the ring mold is removed in sections and the clamp ring 10 is removed by backing out the threaded spindle from its nut, after which the clamp ring and spindle are lifted free of the tire casing, and the latter is removed from its table and is ready for service.

By this process, tires are being put back on the road with thousands of miles of hard wear left in them and at a fraction of new tire cost. No rubber is removed from the side walls or shoulders, and in curing there is no heat applied to the side walls or shoulders, with the result that there is no harmful heating or second curing of the rubber in the fabric carcass, the heat only being applied to the outside of the recap strip 3 requiring curing. The result is that there is no heat-weakened carcass.

Experience shows that by compressing the tire tread, curing to an amount equal to the difference between the length of the "rolling radius" and the length of the normal radius of the tire, the tire is cured under conditions most closely approximating true working conditions, with the result that there is no buckling nor creep of the fabric layers nor the setting up of any harmful movements between the recap strip and the tire body.

What I claim is:

1. The method of recapping a tire which includes the step of applying the cap or tread portion to the tire carcass under pressure exerted radially inwardly and closely approximating the load-bearing conditions of the tire, and then curing while the tire and cap are under pressure and while maintaining the tire in a position simulating the working position and shape of the tire under load.

2. The method of vulcanizing a tread-strip to a tire while the tire is in its normal inflated condition for use, which consists in applying opposed clamps to the side walls of the tire, confining the tread-strip between the tread of the tire and an annular tread-mold, compressing the tread-mold and tire circumferentially to reduce the diameter of the tire to that simulating load bearing conditions of the tire, and curing the tire and cap, under pressure, and while the tire is maintained in a position simulating the working position and shape of the tire under load.

3. The method of vulcanizing a tread-strip to a tire, which consists in confining the side walls of the tires to resist lateral expansion, compressing the tire radially and circumferentially until the tire is reduced to approximately its rolling radius, and curing the tire under pressure while maintaining the tire in a position closely simulating the tire under load-bearing conditions.

4. The process of retreading a tire, which includes the mounting of the tire on a rim, the application of a tread strip of uncured rubber to the prepared periphery of the tire, maintaining the sides of the tire rigidly against lateral expansion, when inflated, applying a tread mold to the outer periphery of the tread strip contracting the mold, and simultaneously compressing the tread strip and tire until the tire has been circumferentially and radially compressed corresponding to a "rolling radius" of the tire simulating the load conditions, inflating the tire to approximately one hundred pounds, and then curing the tread strip under such load conditions.

5. In a method of vulcanizing the tread strip to a pneumatic tire, the steps which consist in placing a mold concentric to the tread strip and exteriorly thereof, contracting the mold radially and circumferentially until the tire and tread strip is compressed to assume substantially the diameter of the rolling radius of the tire, and vulcanizing the tread strip to the tire while so compressed.

6. In a method of vulcanizing the tread strip to a pneumatic tire, the steps which consist in placing a mold concentric to the tread strip and exteriorly thereof, contracting the mold radially and circumferentially until the tire and tread strip is compressed to assume substantially the diameter of the rolling radius of the tire, applying internal pressure to the tire, confining expansion of the side walls of the tire, and subjecting the tread strip to a vulcanizing temperature.

MARTIN M. FISHER.